US012024167B2

(12) United States Patent
Kang (10) Patent No.: US 12,024,167 B2
(45) Date of Patent: *Jul. 2, 2024

(54) DRIVER ASSISTANCE SYSTEM AND DRIVER ASSISTANCE METHOD

(71) Applicant: HL KLEMOVE CORP., Incheon (KR)

(72) Inventor: Boryeon Kang, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 365 days.

This patent is subject to a terminal disclaimer.

(21) Appl. No.: 17/578,876

(22) Filed: Jan. 19, 2022

(65) Prior Publication Data
US 2022/0234583 A1 Jul. 28, 2022

(30) Foreign Application Priority Data
Jan. 22, 2021 (KR) .......................... 10-2021-0009190

(51) Int. Cl.
*B60W 30/14* (2006.01)
*G06V 20/56* (2022.01)
*G06V 20/58* (2022.01)

(52) U.S. Cl.
CPC .......... *B60W 30/143* (2013.01); *G06V 20/58* (2022.01); *G06V 20/588* (2022.01); *B60W 2420/403* (2013.01); *B60W 2420/408* (2024.01); *B60W 2554/4043* (2020.02); *B60W 2554/4045* (2020.02); *B60W 2554/80* (2020.02); *B60W 2720/10* (2013.01)

(58) Field of Classification Search
CPC .......... B60W 30/143; B60W 2420/42; B60W 2420/52; B60W 2554/4043; B60W 2554/4045; B60W 2554/80; B60W 2720/10; B60W 40/04; G06V 20/588
See application file for complete search history.

(56) References Cited

FOREIGN PATENT DOCUMENTS

KR 10-2012-0027565 A 3/2012
KR 10-2013-0107425 A 10/2013

*Primary Examiner* — Jelani A Smith
*Assistant Examiner* — Nada Mahyoob Alqaderi
(74) *Attorney, Agent, or Firm* — Hauptman Ham, LLP (57) ABSTRACT

A driver assistance system that may rapidly determine cutting out of a preceding vehicle based on lane information obtained from a camera, the driver assistance system includes: a first sensor mounted on a vehicle and configured to acquire front image data; a second sensor selected from a group comprising a radar sensor and a lidar sensor, mounted on the vehicle, and configured to acquire front detection data; and a controller configured to select a preceding vehicle as a target vehicle based on the front image data and the front detection data and control a speed of the vehicle to follow the target vehicle, wherein the controller is configured to: recognize a left land and a right lane of a driving lane based on the front image data, calculate a lateral speed of the preceding vehicle based on the front detection data, when a difference between a length of the left lane and a length of the right lane is greater than or equal to a preset value and the lateral speed of the preceding vehicle is greater than or equal to a preset speed, recognize the preceding vehicle as a cut-out vehicle, and recognize a preceding vehicle of the cut-out vehicle as the target vehicle.

20 Claims, 7 Drawing Sheets

DRIVER ASSISTANCE SYSTEM AND DRIVER ASSISTANCE METHOD

CROSS-REFERENCE TO RELATED APPLICATION

This application is based on and claims priority under 35 U.S.C. § 119 to Korean Patent Application No. 10-2021-0009190, filed on Jan. 22, 2021 in the Korean Intellectual Property Office, the disclosure of which is incorporated herein by reference.

BACKGROUND

1. Technical Field

The disclosure relates to a driver assistance system and a driver assistance method, and more specifically, to a driver assistance system and a driver assistance method that may rapidly determine cutting out of a preceding vehicle based on lane information obtained from a camera.

2. Background Art

A vehicle refers to a machine that transports people or cargo by driving on the road or rail. Most vehicles use at least one wheel mounted on a vehicle to move. Such vehicles include three-wheeled or four-wheeled vehicles, two-wheeled vehicles such as motorcycles, heavy construction equipment, bicycles, and railed vehicles such as trains, and the like.

Much research on vehicles equipped with advanced driver assistance systems (ADAS) that actively provide information about a vehicle state, a driver state and traffic environment have been recently carried out to reduce drivers' burden and improve convenience.

In an adaptive cruise control (ACC) as an example of ADAS mounted on a vehicle, when a driver sets a vehicle speed, the vehicle speed may be maintained considering external conditions without driver pressing a brake pedal or an accelerator pedal.

Further, a smart cruise control system (SCC) capable of decelerating or accelerating while maintaining a distance to a preceding vehicle using a radar sensor and camera mounted on a vehicle has been recently developed.

Meanwhile, such SCC determines a target vehicle in front of a vehicle using a front radar and a front camera of the vehicle, and controls an acceleration control device, an engine control device, and a brake control device of the controlled vehicle using information about a relative speed and distance between the controlled vehicle and the target vehicle, a heading direction and angle of the controlled vehicle, a preset longitudinal speed and preset acceleration limit of the controlled vehicle, and the like.

SUMMARY

An aspect of the disclosure provides a driver assistance system and a driver assistance method that may rapidly change a target vehicle by quickly detecting cutting out of a preceding vehicle based on lane information obtained from a camera.

Additional aspects of the disclosure will be set forth in part in the description which follows and, in part, will be obvious from the description, or may be learned by practice of the disclosure.

According to an aspect of the disclosure, there is provided a driver assistance system, including: a first sensor mounted on a vehicle and configured to acquire front image data; a second sensor selected from a group including a radar sensor and a lidar sensor, mounted on the vehicle, and configured to acquire front detection data; and a controller configured to select a preceding vehicle as a target vehicle based on the front image data and the front detection data and control a speed of the vehicle to follow the target vehicle, wherein the controller is configured to: recognize a left land and a right lane of a driving lane based on the front image data, calculate a lateral speed of the preceding vehicle based on the front detection data, when a difference between a length of the left lane and a length of the right lane is greater than or equal to a preset value and the lateral speed of the preceding vehicle is greater than or equal to a preset speed, recognize the preceding vehicle as a cut-out vehicle, and recognize a preceding vehicle of the cut-out vehicle as the target vehicle.

The controller is configured to control the speed of the vehicle to follow the preceding vehicle of the cut-out vehicle when the cut-out vehicle is recognized, and control the speed of the vehicle to prevent the vehicle from passing the cut-out vehicle before a lane change of the cut-out vehicle is complete.

The controller is configured to determine a required acceleration of the vehicle based on a relative location of the cut-out vehicle and a relative speed of the preceding vehicle of the cut-out vehicle, before the lane change of the cut-out vehicle is complete.

The controller is configured to determine that the cut-out vehicle changes lanes in a direction of a shorter lane of the left lane and the right lane.

The controller is configured to recognize the cut-out vehicle as the target vehicle, when the cut-out vehicle has a speed in an opposite direction to a shorter lane of the left lane and the right lane.

The controller is configured to determine that a cut-in vehicle that cuts in to the driving lane from an adjacent lane exists, when a difference between a distance between the vehicle and the preceding vehicle and a length of a shorter lane of the left lane and the right lane is greater than or equal to a threshold value.

The controller is configured to recognize the cut-in vehicle as the target vehicle, when the cut-in vehicle exists.

According to an aspect of the disclosure, there is provided a driver assistance method, including: acquiring front image data of a vehicle; acquiring front detection data of the vehicle; selecting a preceding vehicle as a target vehicle based on the front image data and the front detection data; and controlling a speed of the vehicle to follow the target vehicle, wherein the selecting of the target vehicle includes: recognizing a left land and a right lane of a driving lane based on the front image data; calculating a lateral speed of the preceding vehicle based on the front detection data; when a difference between a length of the left lane and a length of the right lane is greater than or equal to a preset value and the lateral speed of the preceding vehicle is greater than or equal to a preset speed, recognizing the preceding vehicle as a cut-out vehicle, and recognizing a preceding vehicle of the cut-out vehicle as the target vehicle.

The controlling of the speed of the vehicle to follow the target vehicle further includes controlling the speed of the vehicle to follow the preceding vehicle of the cut-out vehicle when the cut-out vehicle is recognized, and controlling the speed of the vehicle to prevent the vehicle from passing the cut-out vehicle before a lane change of the cut-out vehicle is complete.

The controlling of the speed of the vehicle to prevent the vehicle from passing the cut-out vehicle before the lane change of the cut-out vehicle is complete includes determining a required acceleration of the vehicle based on a relative location of the cut-out vehicle and a relative speed of the preceding vehicle of the cut-out vehicle.

The driver assistance method further includes determining that the cut-out vehicle changes lanes in a direction of a shorter lane of the left lane and the right lane.

The selecting of the target vehicle includes recognizing the cut-out vehicle as the target vehicle, when the cut-out vehicle has a speed in an opposite direction to a shorter lane of the left lane and the right lane.

The driver assistance method further includes determining that a cut-in vehicle that cuts in to the driving lane from an adjacent lane exists, when a difference between a distance between the vehicle and the preceding vehicle and a length of a shorter lane of the left lane and the right lane is greater than or equal to a threshold value.

The selecting of the target vehicle further includes recognizing the cut-in vehicle as the target vehicle, when the cut-in vehicle exists.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may be implemented with at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes connection via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

In this disclosure, a 'driving lane' may refer to a lane in which a host vehicle is travelling.

In this disclosure, a 'preceding vehicle' may refer to a vehicle which is the closest to a host vehicle among vehicles in front that are travelling in a driving lane.

Hereinafter, an operation principle and embodiments will be described in detail with reference to the accompanying drawings.

Figure 1:
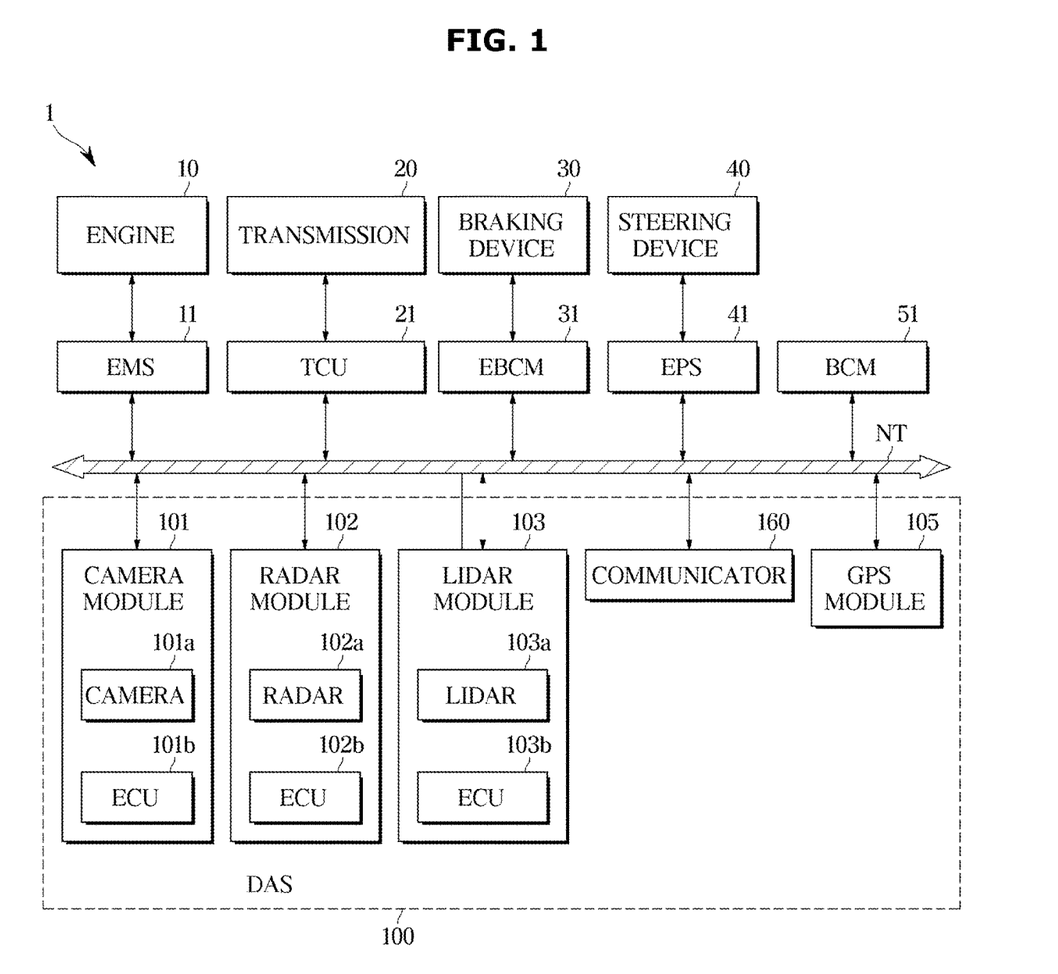
FIG. 1 illustrates a configuration of a vehicle according to an embodiment.

FIG. 1 illustrates a configuration of a vehicle according to an embodiment.

As shown in FIG. 1, a vehicle 1 includes an engine 10, a transmission 20, a braking device 30, and a steering device 40. The engine 10 includes a cylinder and a piston, and may generate power for driving the vehicle 1. The transmission 20 includes a plurality of gears and may transmit the power generated by the engine 10 to vehicle wheels. The braking device 30 may decelerate or stop the vehicle 1 through friction with the vehicle wheels. The steering device 40 may change a driving direction of the vehicle 1.

The vehicle 1 may include a plurality of electronic components. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to a driver's acceleration intention through an accelerator pedal or a request from the DAS 100. For instance, the EMS 11 may control a torque of the engine 10.

The EMS 11 may perform a fuel injection control, a fuel efficiency feedback control, a lean burn control, an ignition timing control, an idle speed control, and the like. The EMS 11 may be a single device or a plurality of devices connected through communication.

The TCU 21 may control the transmission 20 in response to a driver's shift command through a shift lever and/or a driving speed of the vehicle 1. For example, the TCU 21 may adjust a shift ratio from the engine 10 to the vehicle wheels.

The EBCM 31 may control the braking device 30 in response to a driver's braking intention through a brake pedal and/or wheel slip. For example, the EBCM 31 may temporarily release the wheel braking in response to the wheel slip detected when braking the vehicle 1 (anti-lock braking system, ABS). The EBCM 31 may selectively release the wheel braking in response to oversteering and/or understeering detected when steering the vehicle 1 (electronic stability control, ESC). Also, the EBCM 31 may temporarily brake the wheels in response to the wheel slip detected when driving the vehicle 1 (traction control system, TCS).

The EPS 41 may assist operations of the steering device 40 so that a driver may easily manipulate a steering wheel according to a driver's steering intention. For instance, the EPS 41 may assist the operations of the steering device 40 to decrease a steering force when driving at a low speed or when parking, and increase a steering force when driving at a high speed.

The BCM 51 may control operations of electronic components that provide convenience to the driver or secure the driver safety. For example, the BCM 51 may control a head lamp, a wiper, a cluster, a multifunction switch, a turn signal, and the like.

The DAS 100 may assist the driver's operation (driving, braking, and steering). For instance, the DAS 100 may detect an environment (e.g., other vehicles, pedestrians, cyclists, lanes, road signs, traffic lights, etc.) in which the vehicle 1 is travelling, and control driving and/or braking and/or steering of the vehicle 1 in response to the detected environment.

As another example, the DAS 100 may receive a high definition map at a current location of the vehicle 1 from a server through a communicator 160, and control driving and/or braking and/or steering of the vehicle 1 in response to the received high definition map.

The DAS 100 may provide the driver with a variety of functions. For example, the DAS 100 may provide functions such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The DAS 100 may include a camera module 101 that acquires image data around the vehicle 1 and a radar module 102 that acquires data about objects around the vehicle 1. The camera module 101 includes a camera 101*a* and an electronic control unit (ECU) 101*b*, and may photograph a front of the vehicle 1 and recognize other vehicles, pedestrians, cyclists, lanes, road signs, structures, etc. The radar module 102 includes a radar 102*a* and an ECU 102*b*, and may acquire a relative location, a relative speed, and etc., of the objects (e.g., other vehicles, pedestrians, cyclists, structures, etc.) around the vehicle 1.

That is, the DAS 100 may process the image data acquired by the camera module 101 and detection data acquired by the radar module 102, and detect the environment in which the vehicle 1 is travelling, a front object located in front of the vehicle 1 and a lateral object located on the sides of the vehicle 1, in response to processing the image data and the detection data.

Position information of the vehicle 1 is required to be determined so that the DAS 100 performs a fully autonomous driving. Accordingly, the DAS 100 may include a global positioning system (GPS) module 105.

The GPS module 105 may receive a satellite signal including navigation data from at least one GPS satellite. The DAS 100 may acquire a current location, a heading direction, and the like, of the vehicle 1 based on the satellite signal.

As an autonomous driving system is advanced, the DAS 100 for performing autonomous driving is required to calculate a position of the vehicle 1 more precisely.

Accordingly, the DAS 100 may include a light detection and ranging (lidar) module 103 that detects an object around the vehicle 1 by scanning around the vehicle 1. The lidar module 103 includes a lidar 103*a* and an ECU 103*b*, and may acquire a relative location, a relative speed, and etc., of a moving object (e.g., other vehicles, pedestrians, cyclists, structures, etc.) around the vehicle 1. Also, the lidar module 103 may acquire a shape and location of a fixed object (e.g., buildings, signs, traffic lights, speed bumps, etc.) around the vehicle 1.

Specifically, the lidar module 103 may acquire point cloud data for an outside field of view of the vehicle 1 to acquire the shape and location of the fixed object around the vehicle 1.

Also, the DAS 100 may include a communicator 160 that receives the high definition map at the current location of the vehicle 1 from a cloud server. In this instance, the high definition map may refer to a map including information about traffic lights, road signs, curbs, markings, various types of structures, as well as lane information such as a center line, a boundary line, etc., in a three-dimensional (3D) digital form.

The communicator 160 may be implemented using a communication chip, an antenna, and related components to access a wireless communication network. That is, the communicator 160 may be implemented as various types of communication modules capable of long distance communication with an external server. That is, the communicator 160 may include a wireless communication module that may wirelessly transmit and receive data with the external server.

The DAS 100 may process GPS data obtained from the GPS module 105 and/or the point cloud data obtained from the lidar module 103 and/or the high definition map obtained from the communicator 160. Also, the DAS 100 may acquire position information of the vehicle 1 according to the processing result and control the movement of the vehicle 1.

The above-described electronic components may communicate with each other via a vehicle communication network (NT). For example, the electronic components may transmit/receive data through Ethernet, media oriented systems transport (MOST), FlexRay, controller area network (CAN), local interconnect network (LIN), and the like. For example, the DAS 100 may transmit a driving control signal, a braking signal, and a steering signal to the EMS 11, the EBCM 31, and the EPS 41, respectively, through the vehicle communication network (NT).

Figure 2:
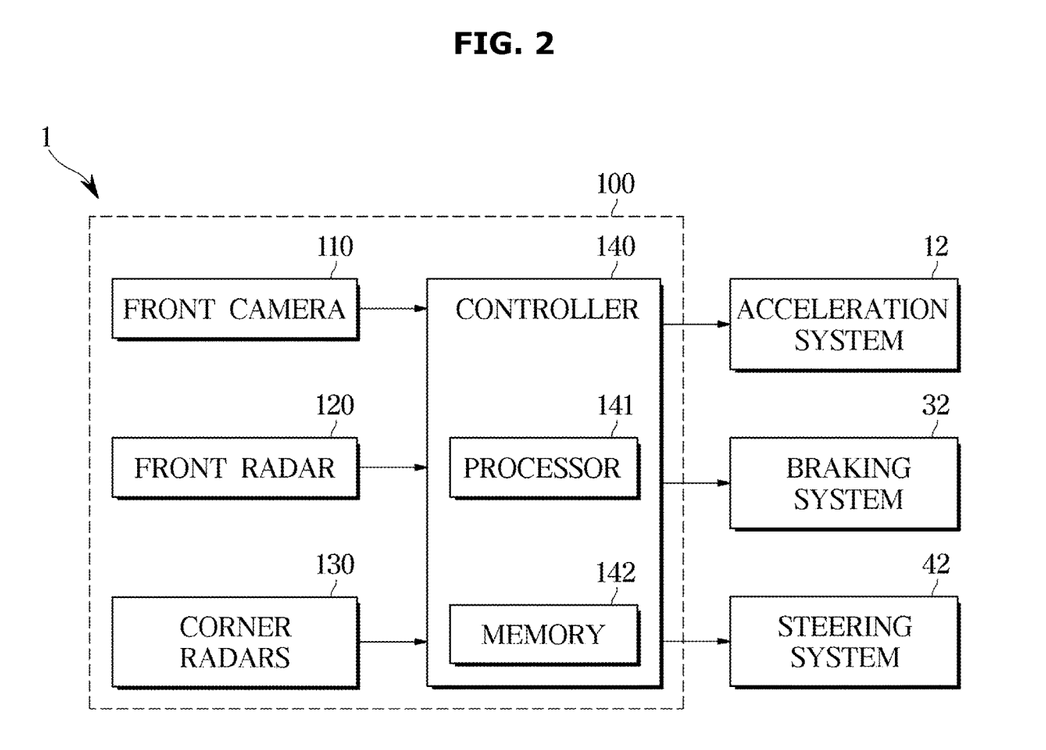
FIG. 2 illustrates a configuration of a driver assistance system according to an embodiment.
Figure 3:
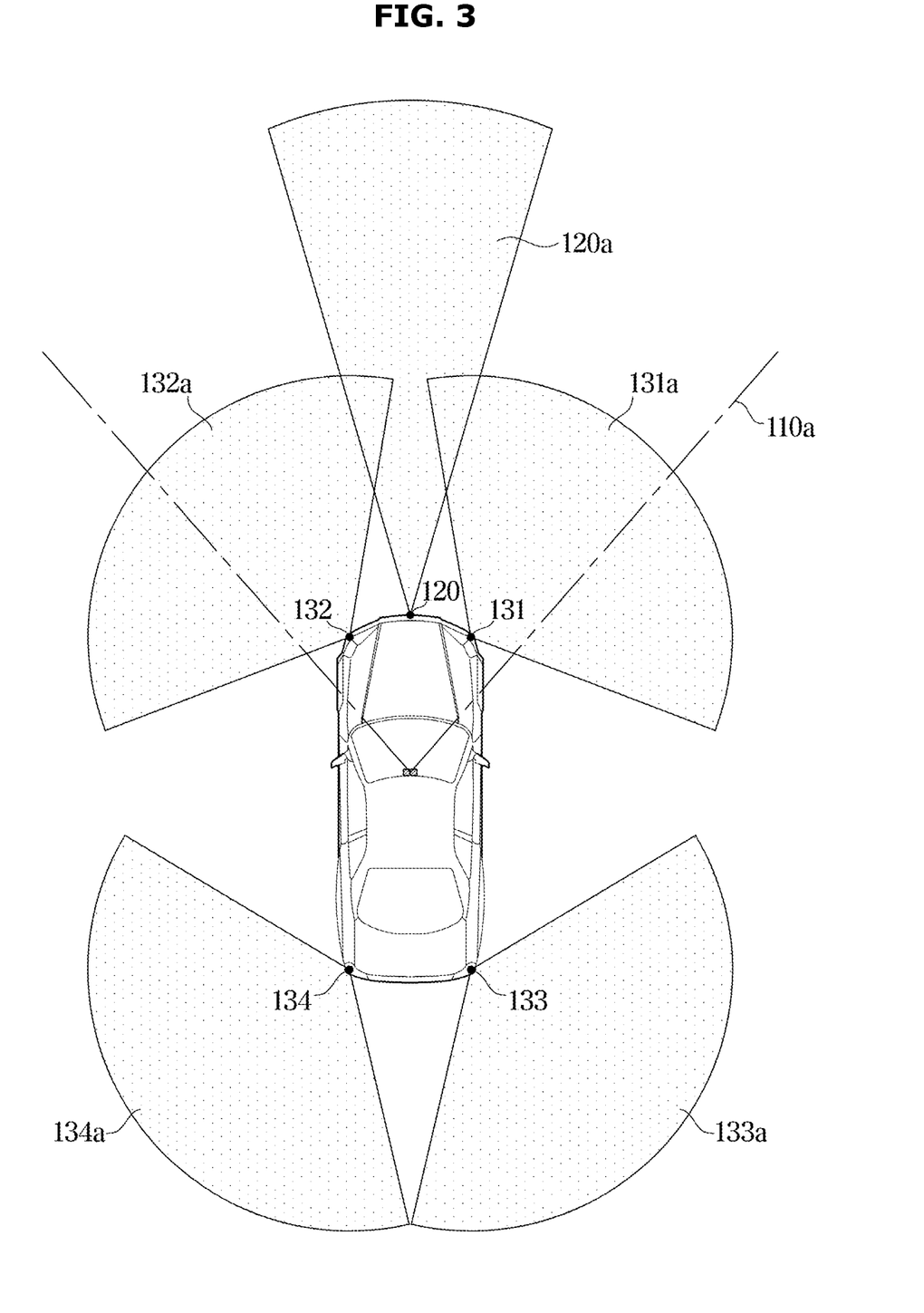
FIG. 3 illustrates a camera and a radar included in a driver assistance system according to an embodiment.

FIG. 2 illustrates a configuration of a driver assistance system according to an embodiment. FIG. 3 illustrates a camera and a radar included in a driver assistance system according to an embodiment.

As shown in FIG. 2, the vehicle 1 may include an acceleration system 12, a braking system 32, a steering system 42 and the DAS 100.

The acceleration system 12 may include the EMS 11 (refer to FIG. 1) and the engine 10 (refer to FIG. 1). The braking system 32 may include the EBCM 31 (refer to FIG. 1) and the braking device 30 (refer to FIG. 1), and the steering system 42 may include the EPS 41 (refer to FIG. 1) and the steering device 40 (refer to FIG. 1).

The DAS 100 may include a front camera 110 and a front radar 120.

As shown in FIG. 3, the front camera 110 may have a field of view 110*a* facing the front of the vehicle 1. For example, the front camera 110 may be installed on a front windshield of the vehicle 1.

The front camera 110 may photograph a front of the vehicle 1 and acquire image data of the front of the vehicle 1.

The front camera 110 may include a plurality of lens and image sensors. The image sensors may include a plurality of photodiodes converting light into an electrical signal, and the plurality of photodiodes may be arranged in a two-dimensional (2D) matrix.

The front camera 110 may be electrically connected to the controller 140. For instance, the front camera 110 may be connected to the controller 140 via a vehicle communication network (NT), a hard wire, or a printed circuit board (PCB).

Accordingly, the front camera 110 may transmit the image data of the front of the vehicle 1 to the controller 140.

As shown in FIG. 3, the front radar 120 may have a field of sensing 120a facing the front of the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an object. The front radar 120 may acquire front radar data from the transmission wave transmitted by the transmission antenna and the reflected wave received by the receiving antenna. The front radar data may include distance information and speed information about other vehicles, pedestrians or cyclists located in front of the vehicle 1. The speed information may include both longitudinal speed information and lateral speed information. The front radar 120 may calculate a relative distance to an object based on a phase difference (or a time difference) between the transmission wave and the reflected wave, and calculate a relative speed of the object based on a frequency difference between the transmission wave and the reflected wave.

For instance, the front radar 120 may be connected to the controller 140 via a vehicle communication network (NT), a hard wire, or a PCB. Accordingly, the front radar 120 may transmit the front radar data to the controller 140.

Also, the DAS 100 may further include a plurality of corner radars 130. The plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

As shown in FIG. 3, the first corner radar 131 may have a field of sensing 131a facing the front right side of the vehicle 1, and the front radar 120 may be installed on a right side of a front bumper of the vehicle 1. The second corner radar 132 may have a field of sensing 132a facing the front left side of the vehicle 1, and may be installed on a left side of the front bumper of the vehicle 1. The third corner radar 133 may have a field of sensing 133a facing the rear right side of the vehicle 1, and may be installed on a right side of a rear bumper of the vehicle 1. The fourth corner radar 134 may have a field of sensing 134a facing the rear left side of the vehicle 1, and may be installed on a left side of the rear bumper of the vehicle 1.

Each of the first to fourth corner radars 131, 132, 133 and 134 may include a transmission antenna and a receiving antenna. The first to fourth corner radars 131, 132, 133 and 134 may acquire first corner radar data, second corner radar data, third corner radar data, and fourth corner radar data, respectively. The first corner radar data may include distance information and speed information about other vehicles, pedestrians, or cyclists (hereinafter, referred to as "object") located on the front right side of the vehicle 1. The second corner radar data may include distance information and speed information about an object located on the front left side of the vehicle 1. The third and fourth corner radar data may include distance information and speed information about objects located on the rear right side or and the rear left side of the vehicle 1.

For example, each of the first to fourth corner radars 131, 132, 133 and 134 may be connected to the controller 140 via a vehicle communication network (NT), a hard wire, or a PCB. Also, the first to fourth corner radars 131, 132, 133 and 134 may transmit to the controller 140 the first to fourth corner radar data, respectively.

The controller 140 may include the ECU 101b (refer to FIG. 1) of the camera module 101 (refer to FIG. 1), and/or the ECU 102b (refer to FIG. 1) of the radar module 102 (refer to FIG. 1), and/or a separate integrated controller.

The controller 140 may include a processor 141 and a memory 142.

The processor 141 may process front image data of the front camera 110 and front radar data of the front radar 120, and generate a driving signal, a braking signal and a steering signal for controlling the acceleration system 12, the braking system 32 and the steering system 42, respectively. For example, the processor 141 may include an image processor for processing the front image data of the front camera 110, and/or a digital signal processor for processing radar data of the front radar 120, and/or a micro control unit (MCU) for generating the driving signal, the braking signal and the steering signal.

The processor 141 may recognize objects (e.g., a preceding vehicle) in front of the vehicle 1 based on the front image data of the front camera 110 and the front radar data of the front radar 120.

Specifically, the processor 141 may acquire locations (distance and direction) and relative speeds of the objects in front of the vehicle 1 based on the front radar data of the front radar 120, and also acquire lane information and/or location (direction) and/or type information of the objects in front of the vehicle 1 based on the front image data of the front camera 110. Also, the processor 141 may match the objects detected by the front image data with the objects detected by the front radar data, and acquire the type information, location and relative speeds of the objects in front of the vehicle 1 based on the matching result.

When a preceding vehicle is recognized from the front image data and/or the front radar data, the processor 141 may select the recognized preceding vehicle as a target vehicle.

In this instance, the processor 141 may select the preceding vehicle as the target vehicle, when a preceding vehicle recognized from the front image data matches a preceding vehicle recognized from the front radar data.

Afterwards, the processor 141 may control the acceleration system 12, the braking system 32 and the steering system 42 to maintain a distance between the vehicle 1 and the target vehicle.

For example, when the distance between the vehicle 1 and the target vehicle is greater than a preset distance, the processor 141 may control the acceleration system 12 to accelerate the vehicle 1 in order to maintain the distance between the vehicle 1 and the target vehicle.

That is, the processor 141 may control a speed of the vehicle 1 to follow the target vehicle. In this instance, the processor 141 may determine a required acceleration to follow the target vehicle and control the acceleration system 12 and/or the braking system 32 to accelerate the vehicle 1 to the required acceleration.

The memory 142 may store a program and/or data for the processer 141 to process image data, a program and/or data for the processer 141 to process radar data, and a program and/or data for the processer 141 to generate the driving signal, and/or the braking signal, and/or the steering signal.

The memory 142 may temporarily store the image data received from the front camera 110 and/or the radar data received from the front radar 120. Also, the memory 142 may temporarily store a processing result of the image data and/or the radar data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The DAS 100 is not limited to that illustrated in FIG. 2, and may further include a lidar that detects objects by scanning around the vehicle 1.

Hereinafter, radar data obtained from a radar and lidar data obtained from a lidar are collectively referred to as detection data, and a driver assistance method according to an embodiment is described in detail based on the above-described configurations of the vehicle 1 and the driver assistance system 100.

Figure 4:
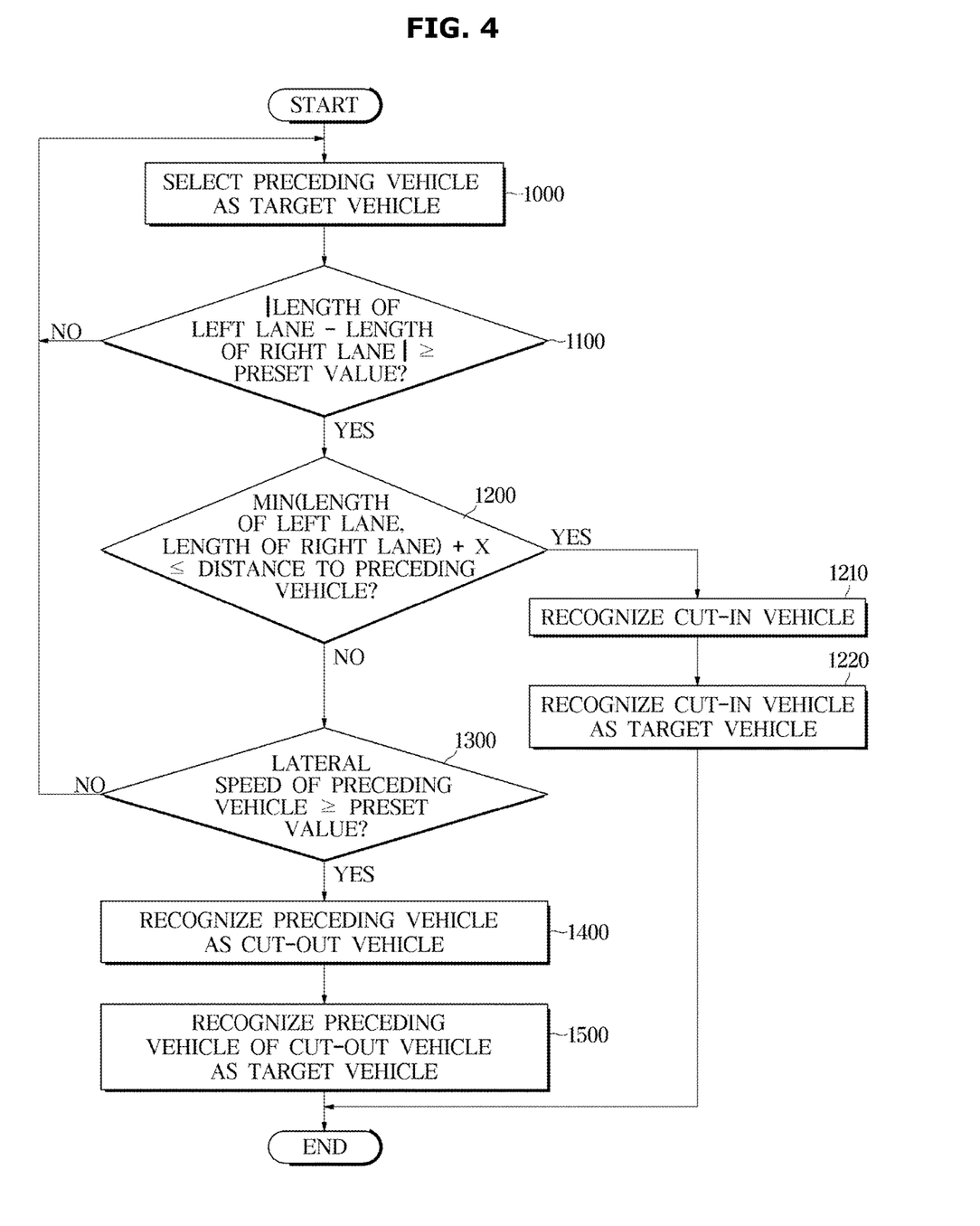
FIG. 4 is a flowchart illustrating a driver assistance method according to an embodiment.
Figure 5:
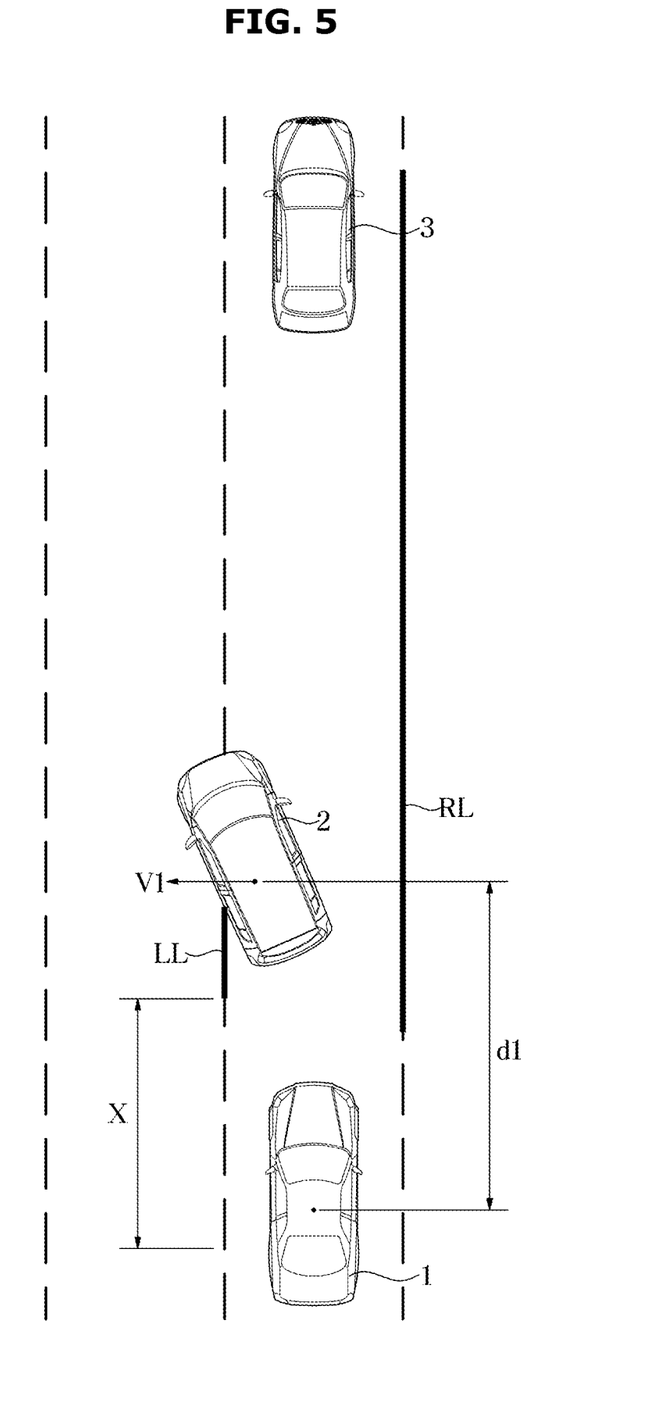
FIG. 5 is a diagram illustrating an example where a preceding vehicle changes lanes.
Figure 6:
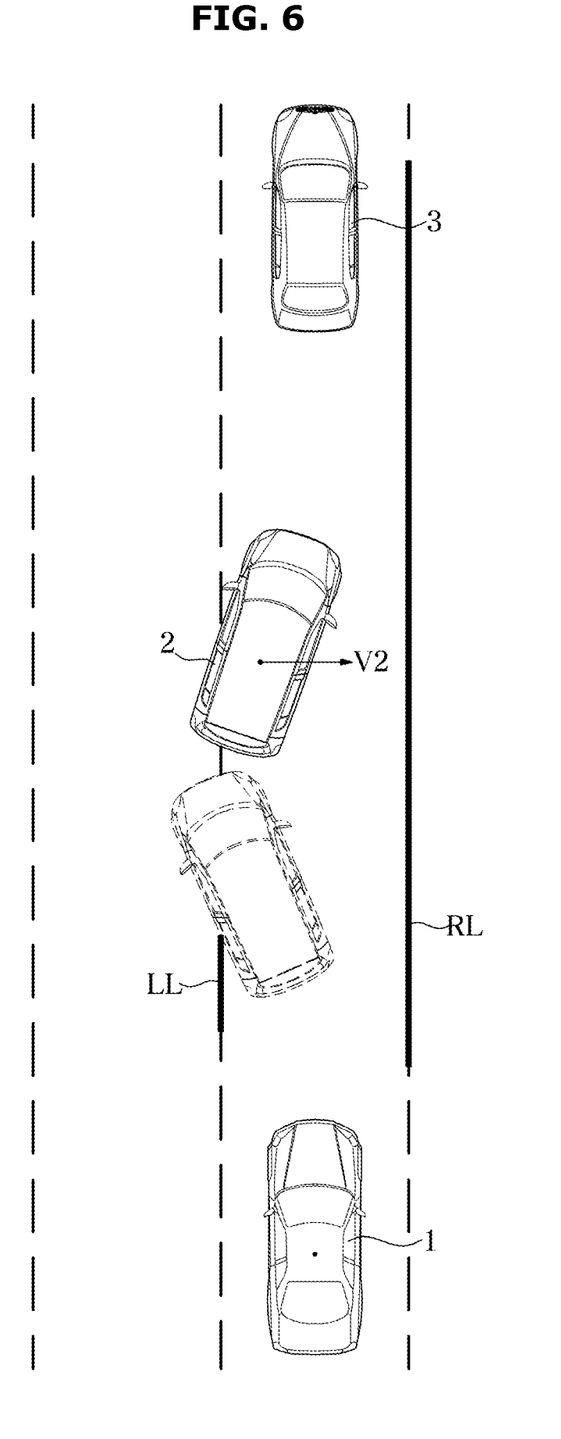
FIG. 6 is a diagram illustrating an example where a preceding vehicle attempts to change lanes and then returns to an original lane.
Figure 7:
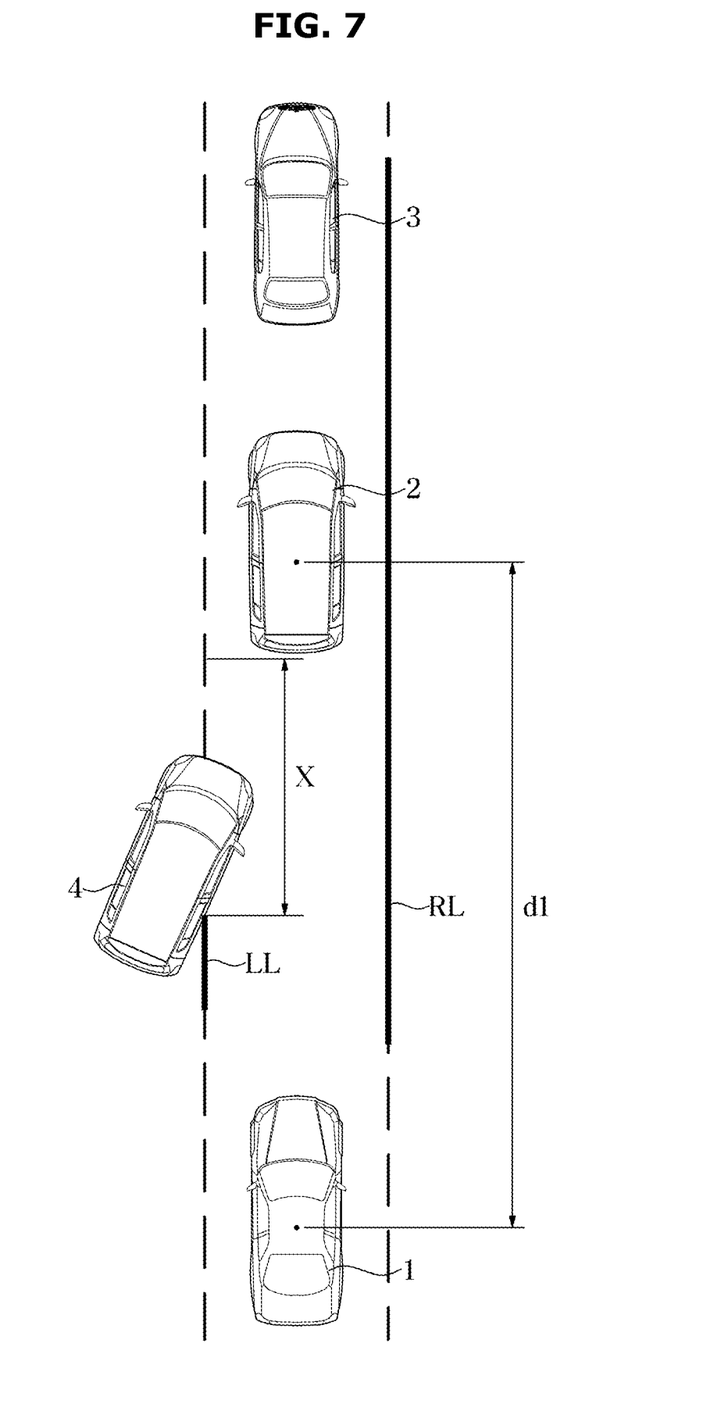
FIG. 7 is a diagram illustrating an example where a side vehicle driving in the next lane changes lanes.

FIG. 4 is a flowchart illustrating a driver assistance method according to an embodiment. FIG. 5 is a diagram illustrating an example where a preceding vehicle changes lanes. FIG. 6 is a diagram illustrating an example where a preceding vehicle attempts to change lanes and then returns to an original lane. FIG. 7 is a diagram illustrating an example where a side vehicle driving in the next lane changes lanes.

Referring to FIG. 4, the front camera 110 and the front radar 120 and/or the lidar may acquire front image data and front detection data of the vehicle 1, respectively, and transmit to the controller 140 the front image data and the front detection data, respectively.

The controller 140 may process the front image data and the front detection data, and select a preceding vehicle as a target vehicle in response to processing the front image data and the front detection data (1000).

Although not illustrated, the DAS 100 may include a smart cruise control (SCC) system, and when the SCC is activated, may control a speed of the vehicle 1 to follow the target vehicle.

The controller 140 may recognize a left lane and a right lane of a driving lane based on the front image data. A variety of image processing methods at common general knowledge level may be used to recognize the lanes of the driving lane.

The controller 140 may determine whether a difference between a length of the left lane and a length of the right lane recognized based on the front image data is greater than or equal to a preset value (1100). When the difference between the length of the left lane and the length of the right lane is greater than or equal to the preset value (Yes in operation 1100), the controller 140 may recognize the preceding vehicle as a cut-out vehicle or a cut-in vehicle.

Specifically, when the difference between the length of the left lane and the length of the right lane is greater than or equal to the preset value, the controller 140 may determine whether a difference between a distance between the vehicle 1 and the preceding vehicle and a length of a shorter lane of the left lane and the right lane is greater than or equal to a threshold value X (1200).

In this instance, the cut-in vehicle may refer to a vehicle that attempts to cut in to the driving lane from an adjacent lane.

When the distance between the vehicle 1 and the preceding vehicle and the length of the shorter lane of the left lane and the right lane is less than the threshold value X (No in operation 1200) and a lateral speed of the preceding vehicle is greater than or equal to a preset speed (Yes in operation 1300), the controller 140 may recognize the preceding vehicle as the cut-out vehicle (1400).

In this instance, the cut-out vehicle may refer to a vehicle that attempts to deviate from the driving lane.

The controller 140 may recognize the preceding vehicle selected as the target vehicle as the cut-out vehicle, recognize a preceding vehicle of the cut-out vehicle as the target vehicle, thereby may change the target vehicle (1500).

Referring to FIG. 5, when a preceding vehicle 2 selected as a target vehicle changes lanes, a length of a left lane (LL) and a length of a right lane (RL) recognized from front image data may be different from each other.

That is, when the preceding vehicle 2 selected as the target vehicle changes lanes, a difference between the length of the left lane (LL) and the length of the right lane (RL) recognized from the front image data may be greater than or equal to a preset value.

In this case, the controller 140 may predict that the preceding vehicle 2 selected as the target vehicle may deviate from a driving lane, and when a lateral speed V1 of the preceding vehicle 2 is greater than or equal to a preset speed, the controller 140 may recognize the preceding vehicle 2 as a cut-out vehicle.

Afterwards, by recognizing a preceding vehicle 3 of the cut-out vehicle 2 as a target vehicle, the controller 140 may quickly predict a lane change of the cut-out vehicle 2 even before the cut-out vehicle 2 changes lanes, and rapidly change the target vehicle to the pre-preceding vehicle 3.

In this instance, the controller 140 may determine that the cut-out vehicle 2 changes lanes in a direction of a shorter lane (LL) of the left lane (LL) and the right lane (RL).

Also, when a difference between a distance between the vehicle 1 and the preceding vehicle 2 and a length of the shorter lane (LL) of the left lane (LL) and the right lane (RL) is less than or equal to the threshold value X, the controller 140 may recognize the preceding vehicle 2 as the cut-out vehicle, and the threshold value X may be set to an overall length of a general vehicle and stored in the memory 142.

When the difference between the distance between the vehicle 1 and the preceding vehicle 2 and the length of the shorter lane (LL) of the left lane (LL) and the right lane (RL) is greater than or equal to the threshold value X, which may indicate that the length of the left lane (LL) is not shortened due to the lane change of the preceding vehicle 2.

When the cut-out vehicle 2 is recognized, the controller 140 may control a speed of the vehicle 1 to follow the preceding vehicle 3 of the cut-out vehicle 2, and also control the speed of the vehicle 1 to prevent the vehicle 1 from passing the cut-out vehicle 2, before the lane change of the cut-out vehicle 2 is complete.

For example, before the lane change of the cut-out vehicle 2 is complete, the controller 140 may determine a required acceleration of the vehicle 1 based on a relative location of the cut-out vehicle 2 and a relative speed of the preceding vehicle 3 of the cut-out vehicle 2.

That is, by determining the required acceleration of the vehicle 1 based on the relative location of the cut-out vehicle 2 and the relative speed of the target vehicle 3, the controller 140 may determine an optimum required acceleration that may follow the target vehicle 3 while preventing a collision with the cut-out vehicle 2.

When the preceding vehicle 3 of the cut-out vehicle 2 is selected as the target vehicle and the required acceleration of the vehicle 1 is determined based on only relative location and relative speed of the target vehicle 3, the vehicle 1 may collide with the cut-out vehicle 2.

As an example, referring to FIG. 6, when the vehicle 1 follows the target vehicle 3 even when the preceding vehicle 2 recognized as the cut-out vehicle is returned to the driving lane again, a collision between the vehicle 1 and the preceding vehicle 2 may occur.

To prevent this, when the cut-out vehicle 2 has a speed V2 in an opposite direction to the shorter lane (LL) of the left lane (LL) and the right lane (RL), the controller 140 may recognize the cut-out vehicle 2 as the target vehicle again.

According to an embodiment of the disclosure, the target vehicle may be changed by rapidly determining the cut-out vehicle, and thus an optimum required acceleration of the vehicle 1 may be determined and a collision with the cut-out vehicle may be efficiently prevented.

Referring again to FIG. 4, when the difference between the distance between the vehicle 1 and the preceding vehicle and the length of the shorter lane of the left lane and the right lane is greater than or equal to the threshold value X (Yes in operation 1200), the controller 140 may determine that a cut-in vehicle that cuts in to the driving lane from an adjacent lane exists (1210).

Afterwards, when the cut-in vehicle exists, the controller 140 may recognize the cut-in vehicle as the target vehicle (1220).

Specifically, referring to FIG. 7, when a difference between a distance dl between the vehicle 1 and the preceding vehicle 2 selected as the target vehicle and the length of the left lane (LL) is greater than or equal to the threshold value X, it may be confirmed that the length of the left lane (LL) shorter than that of the right lane (RL) is not caused by the target vehicle 2.

In this case, it may be confirmed that the length of the left lane (LL) shorter than that of the right lane (RL) is caused by another vehicle 4 that cuts in to the driving lane from an adjacent lane.

That is, when the difference between the distance dl between the vehicle 1 and the preceding vehicle 2 and the length of the shorter lane (LL) of the left lane (LL) and the right lane (RL) is greater than or equal to the threshold value X, the controller 140 may determine that the cut-in vehicle 4 that cuts in to the driving lane from the adjacent lane exists, and also recognize the cut-in vehicle 4 as the target vehicle.

According to the disclosure, it may be rapidly determined whether a cut-in vehicle or a cut-out vehicle exists based on lane information acquired from front image data, and a target vehicle may be changed depending on the presence or absence of the cut-in vehicle or cut-out vehicle, thereby improving a performance of the driver assistance system.

As is apparent from the above, according to the embodiments of the disclosure, the driver assistance system and the method thereof can quickly determine cutting out of a preceding vehicle or cutting in of an adjacent vehicle, thereby can improve a performance of a smart cruise control system.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A driver assistance system, comprising:
a first sensor mounted on a vehicle and configured to acquire front image data;
a second sensor selected from a group comprising a radar sensor and a lidar sensor, mounted on the vehicle, and configured to acquire front detection data; and
a controller configured to select a preceding vehicle as a target vehicle based on the front image data and the front detection data and control a speed of the vehicle to follow the target vehicle,
wherein the controller is configured to:
recognize a left land and a right lane of a driving lane based on the front image data,
calculate a lateral speed of the preceding vehicle based on the front detection data,
when a difference between a length of the left lane and a length of the right lane is greater than or equal to a preset value and the lateral speed of the preceding vehicle is greater than or equal to a preset speed, recognize the preceding vehicle as a cut-out vehicle, and recognize a preceding vehicle of the cut-out vehicle as the target vehicle.

2. The driver assistance system of claim 1, wherein the controller is configured to control the speed of the vehicle to follow the preceding vehicle of the cut-out vehicle when the cut-out vehicle is recognized, and control the speed of the vehicle to prevent the vehicle from passing the cut-out vehicle before a lane change of the cut-out vehicle is complete.

3. The driver assistance system of claim 2, wherein the controller is configured to determine a required acceleration of the vehicle based on a relative location of the cut-out vehicle and a relative speed of the preceding vehicle of the cut-out vehicle, before the lane change of the cut-out vehicle is complete.

4. The driver assistance system of claim 1, wherein the controller is configured to determine that the cut-out vehicle changes lanes in a direction of a shorter lane of the left lane and the right lane.

5. The driver assistance system of claim 1, wherein the controller is configured to recognize the cut-out vehicle as the target vehicle, when the cut-out vehicle has a speed in an opposite direction to a shorter lane of the left lane and the right lane.

6. The driver assistance system of claim 1, wherein the controller is configured to determine that a cut-in vehicle that cuts in to the driving lane from an adjacent lane exists, when a difference between a distance between the vehicle and the preceding vehicle and a length of a shorter lane of the left lane and the right lane is greater than or equal to a threshold value.

7. The driver assistance system of claim 6, wherein the controller is configured to recognize the cut-in vehicle as the target vehicle, when the cut-in vehicle exists.

8. A driver assistance method, comprising:
acquiring front image data of a vehicle;
acquiring front detection data of the vehicle;
selecting a preceding vehicle as a target vehicle based on the front image data and the front detection data; and
controlling a speed of the vehicle to follow the target vehicle,
wherein the selecting of the target vehicle comprises:
recognizing a left land and a right lane of a driving lane based on the front image data;
calculating a lateral speed of the preceding vehicle based on the front detection data;
when a difference between a length of the left lane and a length of the right lane is greater than or equal to a preset value and the lateral speed of the preceding vehicle is greater than or equal to a preset speed, recognizing the preceding vehicle as a cut-out vehicle, and recognizing a preceding vehicle of the cut-out vehicle as the target vehicle.

9. The driver assistance method of claim 8, wherein the controlling of the speed of the vehicle to follow the target vehicle further comprises controlling the speed of the vehicle to follow the preceding vehicle of the cut-out vehicle when the cut-out vehicle is recognized, and controlling the speed of the vehicle to prevent the vehicle from passing the cut-out vehicle before a lane change of the cut-out vehicle is complete.

10. The driver assistance method of claim 9, wherein the controlling of the speed of the vehicle to prevent the vehicle from passing the cut-out vehicle before the lane change of the cut-out vehicle is complete comprises determining a required acceleration of the vehicle based on a relative location of the cut-out vehicle and a relative speed of the preceding vehicle of the cut-out vehicle.

11. The driver assistance method of claim 8, further comprising:
determining that the cut-out vehicle changes lanes in a direction of a shorter lane of the left lane and the right lane.

12. The driver assistance method of claim 8, wherein the selecting of the target vehicle comprises recognizing the cut-out vehicle as the target vehicle, when the cut-out vehicle has a speed in an opposite direction to a shorter lane of the left lane and the right lane.

13. The driver assistance method of claim 8, further comprising:
determining that a cut-in vehicle that cuts in to the driving lane from an adjacent lane exists, when a difference between a distance between the vehicle and the preceding vehicle and a length of a shorter lane of the left lane and the right lane is greater than or equal to a threshold value.

14. The driver assistance method of claim 13, wherein the selecting of the target vehicle further comprises recognizing the cut-in vehicle as the target vehicle, when the cut-in vehicle exists.

15. A non-transitory computer-readable medium storing computer-executable instructions when executed by a processor, cause the processor to:
acquire front image data of a vehicle;
acquire front detection data of the vehicle;
select a preceding vehicle as a target vehicle based on the front image data and the front detection data; and
control a speed of the vehicle to follow the target vehicle,
wherein the instructions, when executed by the processor, further cause the processor to:
recognize a left land and a right lane of a driving lane based on the front image data,
calculate a lateral speed of the preceding vehicle based on the front detection data,
when a difference between a length of the left lane and a length of the right lane is greater than or equal to a preset value and the lateral speed of the preceding vehicle is greater than or equal to a preset speed, recognize the preceding vehicle as a cut-out vehicle, and recognize a preceding vehicle of the cut-out vehicle as the target vehicle.

16. The non-transitory computer-readable medium of claim 15, wherein the instructions, when executed by the processor, further cause the processor to:
control the speed of the vehicle to follow the preceding vehicle of the cut-out vehicle when the cut-out vehicle is recognized, and control the speed of the vehicle to prevent the vehicle from passing the cut-out vehicle before a lane change of the cut-out vehicle is complete.

17. The non-transitory computer-readable medium of claim 16, wherein the instructions, when executed by the processor, further cause the processor to:
determine a required acceleration of the vehicle based on a relative location of the cut-out vehicle and a relative speed of the preceding vehicle of the cut-out vehicle.

18. The non-transitory computer-readable medium of claim 15, wherein the instructions, when executed by the processor, further cause the processor to:
determine that the cut-out vehicle changes lanes in a direction of a shorter lane of the left lane and the right lane.

19. The non-transitory computer-readable medium of claim 15, wherein the instructions, when executed by the processor, further cause the processor to:
recognize the cut-out vehicle as the target vehicle, when the cut-out vehicle has a speed in an opposite direction to a shorter lane of the left lane and the right lane.

20. The non-transitory computer-readable medium of claim 15, wherein the instructions, when executed by the processor, further cause the processor to:
determine that a cut-in vehicle that cuts in to the driving lane from an adjacent lane exists, when a difference between a distance between the vehicle and the preceding vehicle and a length of a shorter lane of the left lane and the right lane is greater than or equal to a threshold value.

* * * * *